(12) United States Patent
Smith et al.

(10) Patent No.: US 10,036,424 B2
(45) Date of Patent: Jul. 31, 2018

(54) BEARING GREASE

(71) Applicant: Insight Analytics Solutions Holdings Limited, Nottingham (GB)

(72) Inventors: Richard Smith, Nottingham (GB); Ashley Crowther, Boulder, CO (US); Jesse Harris Graeter, Boulder, CO (US); Scott Macindoe, Warwick (GB); Michael Ulfert Homemann, Eaglewood, CO (US)

(73) Assignee: INSIGHT ANALYTICS SOLUTIONS HOLDINGS LIMITED, Nottingham (GB)

( * ) Notice: Subject to any disclaimer, the term of this patent is extended or adjusted under 35 U.S.C. 154(b) by 0 days.

(21) Appl. No.: 14/675,898

(22) Filed: Apr. 1, 2015

(65) Prior Publication Data

US 2015/0377294 A1 Dec. 31, 2015

(30) Foreign Application Priority Data

Apr. 1, 2014 (GB) .................................. 1405841.6
May 19, 2014 (GB) .................................. 1408825.6

(Continued)

(51) Int. Cl.
  *F16C 33/66* (2006.01)
  *F03D 80/55* (2016.01)
  (Continued)

(52) U.S. Cl.
  CPC .......... *F16C 33/6622* (2013.01); *B01D 35/02* (2013.01); *B08B 3/02* (2013.01);
  (Continued)

(58) Field of Classification Search
  None
  See application file for complete search history.

(56) References Cited

U.S. PATENT DOCUMENTS 6,626,191 B1  9/2003  Slabbert
6,712,080 B1  3/2004  Handschuh et al.
(Continued)

FOREIGN PATENT DOCUMENTS

CN  1059301 A  3/1992
CN  1251542 A  4/2000
(Continued)

OTHER PUBLICATIONS

UK Intellectual Property Office, Combined Search & Examination Report for GB1501021.8, dated Feb. 11, 2015.
(Continued)

*Primary Examiner* — Michael Kornakov
*Assistant Examiner* — Ryan Coleman
(74) *Attorney, Agent, or Firm* — Westman, Champlin & Koehler, P.A.

(57) ABSTRACT

A method is disclosed for replacing grease in a main bearing of a wind turbine, the main bearing located in a housing and the housing having least one cover plate. the bearing cover plate is removed from the housing, grease is manually removed from the main bearing, and a flushing cover is installed on the housing in place of the bearing cover plate. The flushing cover has at least two parts, the parts fitting around the main shaft, and each part having a seal so that when its attached to the bearing housing, the flushing cover forms a seal with the main shaft. The flushing cover has holes allowing access to the main bearing, and a solvent or oil is sprayed via one of the holes onto the main bearing to remove grease, the remaining holes being sealed by a removable plug. Solvent or oil is pumped out of the housing via a port at the bottom of the housing or flushing cover. The process is repeated for each hole, and the flushing cover removed, the main bearing packed with grease, and the bearing cover plate re-affixed. The spraying step involves
(Continued)

pumping solvent or oil from a reservoir to the spray nozzle, and the step of pumping solvent or oil out of the bearing housing involves pumping solvent or oil to the reservoir via a return hose. This means that the solvent or oil is recycled during the replacing of the grease. An apparatus for flushing grease from a main bearing of a wind turbine is also described.

14 Claims, 4 Drawing Sheets

(30)  Foreign Application Priority Data

Jul. 9, 2014 (GB) .................................. 1412245.1
Jan. 21, 2015 (GB) .................................. 1501021.8

(51) Int. Cl.
*B08B 9/00* (2006.01)
*B01D 35/02* (2006.01)
*B08B 3/02* (2006.01)
*B08B 3/10* (2006.01)
*F03D 80/70* (2016.01)
*F03D 80/50* (2016.01)

(52) U.S. Cl.
CPC .................. *B08B 3/10* (2013.01); *B08B 9/00* (2013.01); *F03D 80/50* (2016.05); *F03D 80/55* (2016.05); *F03D 80/70* (2016.05); *F05B 2240/50* (2013.01); *F16C 2360/31* (2013.01); *Y02E 10/72* (2013.01)

(56)  References Cited

U.S. PATENT DOCUMENTS

| 8,004,106 | B2 | 8/2011 | Daniels et al. |
| 2008/0099280 | A1 | 5/2008 | Kroh et al. |
| 2011/0293425 | A1 | 12/2011 | Numajiri et al. |
| 2013/0068253 | A1 | 3/2013 | Gonzalez et al. |
| 2014/0044519 | A1 | 2/2014 | Sohnetgoeke et al. |

FOREIGN PATENT DOCUMENTS

| CN | 102380485 | A | 3/2012 |
| EP | 0995501 | A1 | 4/2000 |
| EP | 2325486 | A1 | 5/2011 |
| EP | 2657556 | A2 | 10/2013 |
| EP | 2806097 | A1 | 12/2014 |
| JP | 65733224 | A | 2/1982 |
| TW | 412622 | B | 11/2000 |
| WO | 2007104102 | A1 | 9/2007 |

OTHER PUBLICATIONS

Chinese Search Report dated Apr. 1, 2015 for Chinese Application No. 2015102555540.
European Search Report dated Sep. 23, 2015 for EP Application No. 15275108.
GB Search Report dated Feb. 9, 2015 for GB Application No. 1501021.8.
GB Search Report dated Jun. 8, 2015 for GB Application No. 1508605.1.

BEARING GREASE

BACKGROUND OF THE INVENTION

The present invention relates to improvements to the lubrication of wind turbine main bearings. In particular it relates to the flushing of grease from a wind turbine main bearing during replacement of the grease during maintenance.

BRIEF SUMMARY OF THE INVENTION

Wind or water turbine main bearing are typically formed of roller bearings. Effective lubrication difficult to achieve because of the slow rotation speeds of the rotor and the wide ranges of operating temperature. Grease lubrication is widely used for such bearings, and its consistency prevents it from leaking out of the bearing, makes it easy to use, and gives it good sealing properties. However packed grease does not move around within the bearing arrangement under typical turbine operating conditions. This means that debris from bearing wear does not escape from the bearing, and will contribute to further wear and damage.

The present invention provides apparatus and methods for removing old grease from a wind turbine main bearing by a flushing process. The invention provides efficient ways of utilising small volumes (less than 50 L) of cleaning fluid to flush out and clean rolling elements of a main bearing during grease replacement in maintenance. Typically, the cleaning fluid is a solvent, preferably a high flash point solvent, or oil.

According to a first aspect of the invention, there is provided a method for replacing grease in a main bearing of a wind turbine, the main bearing located in a housing and the housing has at least one cover plate. The method comprising the steps of: removing the bearing cover plate from the housing; manually removing grease from the main bearing; installing a flushing cover on the housing in place of the bearing cover plate, in which the flushing cover comprises a plurality of holes allowing access to the main bearing; inserting removable plugs into one or more of the holes in order to stop cleaning fluid used for flushing, or grease escaping; spraying a cleaning fluid via one of the holes onto the main bearing to remove grease, the remaining holes being sealed by a corresponding removable plug; pumping cleaning fluid out of the housing via a port at the bottom of the housing; repeating steps d and e) for each hole; removing the flushing cover; packing the main bearing with grease; and reinstalling the bearing cover. The flushing cover comprises at least two parts, the parts fitting around the main shaft, each part comprising sealing means on a radially inner surface. When attached to the bearing housing, the flushing cover forms a seal with the main shaft. The step of spraying a cleaning fluid comprises: providing a reservoir containing cleaning fluid; providing a spraying means; and providing a first pumping means for pumping cleaning fluid from the reservoir to the spraying means via a supply hose; and in which the step of pumping cleaning fluid out of the bearing housing additionally comprises providing a second pumping means for pumping cleaning fluid to the reservoir via a return hose; wherein, in use, the cleaning fluid is recycled during the replacing of the grease.

According to further aspects of the invention, there is provided a method for flushing grease from a main bearing and main bearing housing of a wind turbine comprising the steps of: a) providing access to the main bearing; b) installing a flushing means on the housing, in which the flushing means comprises a plurality of sealable holes allowing access to the main bearing; c) spraying a cleaning fluid via one of the sealable holes onto the main bearing to remove grease, the remaining holes being sealed stopping the cleaning fluid and removed grease escaping; d) pumping cleaning fluid and removed grease out of the housing; and e) repeating steps c) and d) as required, spraying the fluid via one or more of the remaining sealable holes.

Preferably, the flushing means comprises a plurality of holes arranged around an outer region allowing access to the main bearing.

Preferably, the step of spraying a cleaning fluid comprises: providing a reservoir containing cleaning fluid; providing a spraying means; and providing a first pumping means for pumping cleaning fluid from the reservoir to the spraying means via a supply hose. The spraying means comprising one or more spray nozzles. The supply hose comprising one or more supply filters. Including providing connection means for connecting the one or more supply filters to the supply hose. Including providing connection means for connecting the first pumping means to the supply hose. Including providing connection means for connecting the spraying means to the supply hose.

Preferably, the step of pumping cleaning fluid out of the bearing housing additionally comprises providing a second pumping means for pumping cleaning fluid to the reservoir via a return hose; wherein, in use, the cleaning fluid is recycled during the replacing of the grease. The return hose comprising one or more return filters. Including providing connection means for connecting the one or more return filters to the return hose. The port comprises an exit port in the flushing cover, whereby the return hose is connected to the exit port. Including providing connection means for connecting the second pumping means to the return hose. Including providing connection means for connecting the exit port to the return hose. The connection means is a dry break coupling. The first pumping means is a pressure pump. The second pumping means is a suction pump. Including providing a module comprising the reservoir, the first pumping means and the second pump means. Including providing a module comprising the supply filter. Including providing a module comprising the return filter.

Preferably, the reservoir has a capacity in the range of 10 to 50 L, or in the range of 25 to 35 L.

Preferably, the cleaning fluid comprises a solvent. The solvent is a high flash point solvent. Preferably, the cleaning fluid comprises oil. The oil is hot oil. Including providing heating means for heating the oil. The heating means comprises indirect heating means.

According to further aspects of the invention, there is provided an apparatus for flushing grease from a main bearing of a wind turbine, the apparatus comprising: a flushing cover comprising attachment means for mounting on the housing of the main bearing, the flushing cover further comprising a plurality of holes, the flushing cover further comprising an exit port; a corresponding plurality of removable plugs for sealing the holes; a reservoir containing the cleaning fluid; a spraying means; a first pumping means for pumping cleaning fluid from the reservoir to the spraying means via a supply hose; a second pumping means for pumping cleaning fluid from the exit port to the reservoir via a return hose; in which the flushing cover comprises at least two parts, the parts fitting around the main shaft, each part comprising sealing means on a radially inner surface wherein, when attached to the bearing housing, the flushing cover forms a seal with the main shaft; and wherein, pumping cleaning fluid to the spraying means and spraying the cleaning fluid onto the main bearing via one of the holes for admission of a cleaning fluid, the remaining holes being sealed by a corresponding removable plug, flushes grease from the main bearing.

BRIEF DESCRIPTION OF THE SEVERAL VIEWS OF THE DRAWING

The present invention will now be described, by way of example only, with reference to the accompanying drawings, in which.

DETAILED DESCRIPTION OF THE INVENTION

Figure 1:
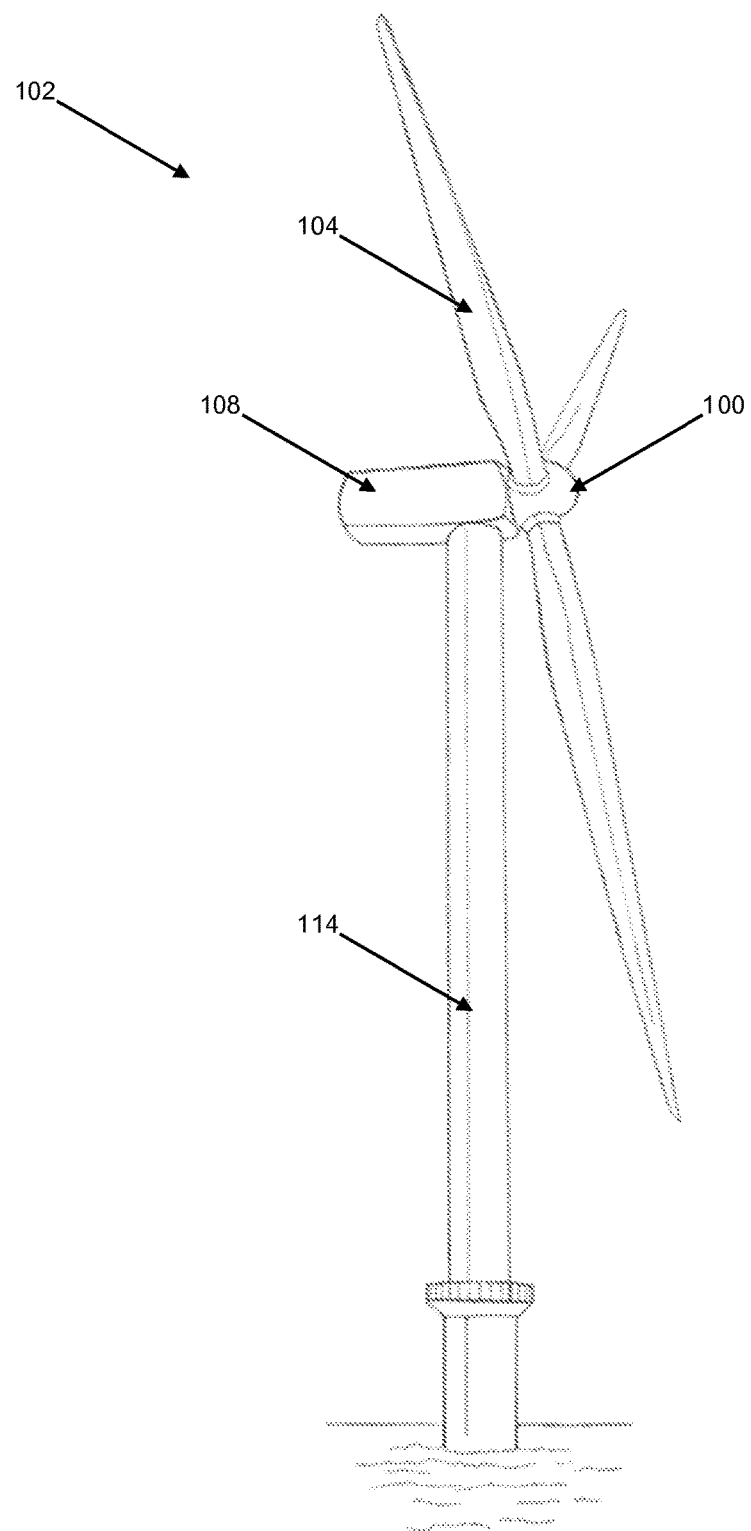
FIG. 1 shows an external view of an offshore wind turbine.

FIG. 1 is a perspective view of an example of a wind turbine. Although an offshore wind turbine is shown, it should be noted that the description below may be applicable to other types of wind turbines. The wind turbine 102 includes rotor blades 104 mounted to a hub 100, which is supported by a nacelle 108 on a tower 114. Wind causes the rotor blades 104 and hub 106 to rotate about a main axis. This rotational energy is delivered to a main shaft, which is part of a power transmission system housed within the nacelle 108. The main shaft is supported by a bearing arrangement within a bearing housing. The bearing housing is attached to a mainframe (not shown) via bolts. An upwind and a downwind bearing cover are attached to the bearing housing via fastener means.

Figure 2:
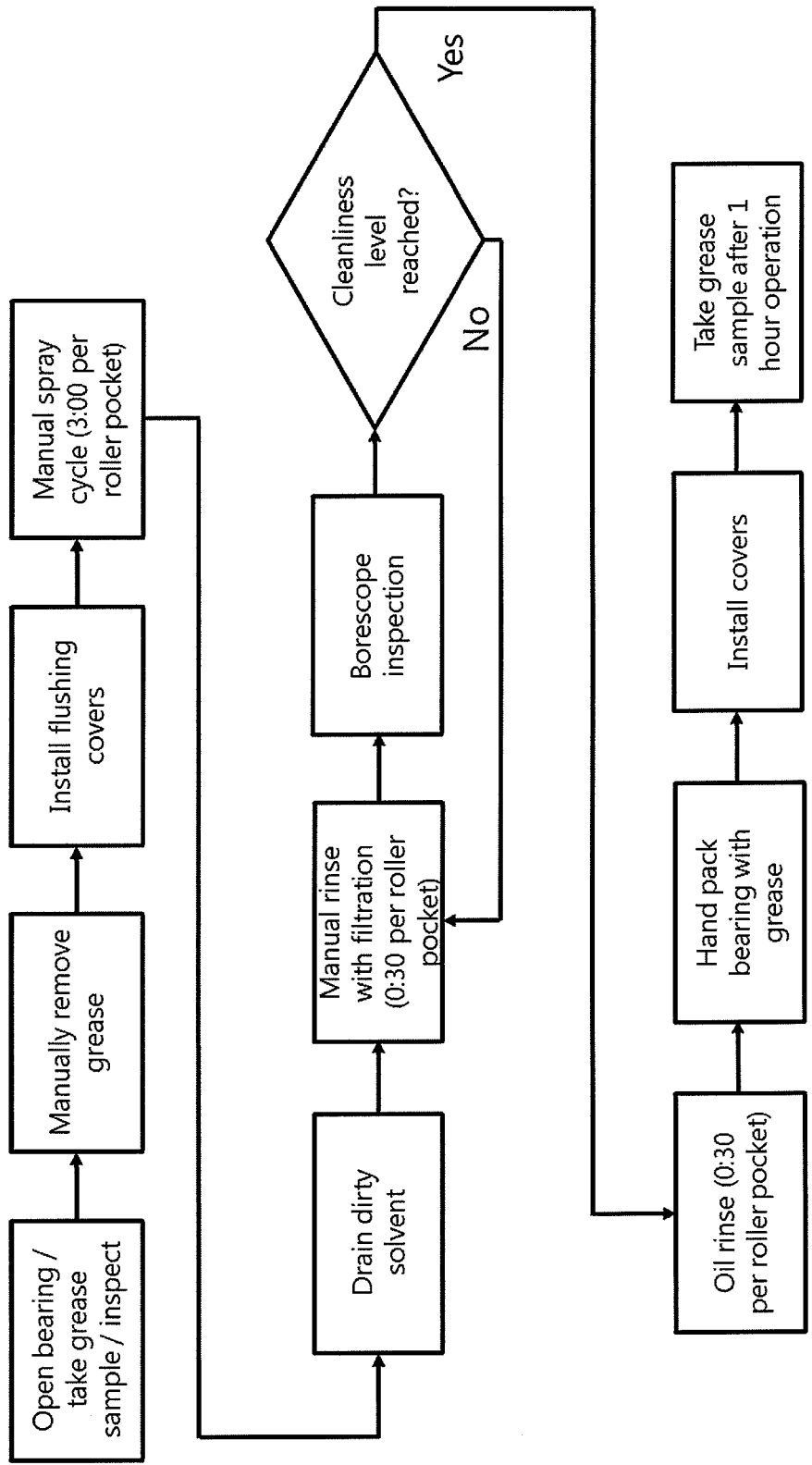
FIG. 2 shows an embodiment of a method of the present invention.

FIG. 2 shows a method for performing a main bearing flush, in which the grease in a main bearing of a wind turbine is replaced, for example, when maintenance or inspection is required. In a first step, the bearing cover plate is removed from the housing. This opens the bearing and it permits grease sampling or inspection. In a second step, much of the grease in the bearing is removed manually, but this leaves residual grease within the housing. In a third step, a flushing cover is installed on the housing in place of the bearing cover plate. The flushing cover comprises a plurality of holes arranged radially around the main bearing—these allow access to the main bearing and correspond to the roller pockets.

At this point (step 4), a spray cycle is done, typically of 3 minutes duration per flushing cover hole or roller pocket. This involves spraying a cleaning fluid via one of the holes onto the main bearing to remove grease, the remaining holes being sealed by a corresponding removable plug.

In step 5 the dirty cleaning fluid from this cycle is pumped out of the housing via a port at the bottom of the housing; this is a continuous process occurring at the same time as step 4.

Step 6 is similar to steps 4 and 5 together, except that in these steps, the cleaning fluid is filtered to remove particulate material, typically less than 10 microns. These steps are also of shorter duration, typically 30 s per roller pocket.

At step 7, a borescope can be used to assess the progress of the flushing/cleaning process. If it is adjudged to be complete (step 8), for example by an apparent absence of grease, then in step 9 the bearings are given an oil rinse of about 30 s per roller pocket to remove traces of cleaning fluid. If not then steps 6 and 7 are repeated. When the required cleanliness level is reached, the flushing covers are removed at this point and in step 9, the bearing is hand packed with grease.

In step 10, the bearing cover plate is re-installed. A grease sample for analysis can be taken after a short period of operation (step 11).

Figure 3:
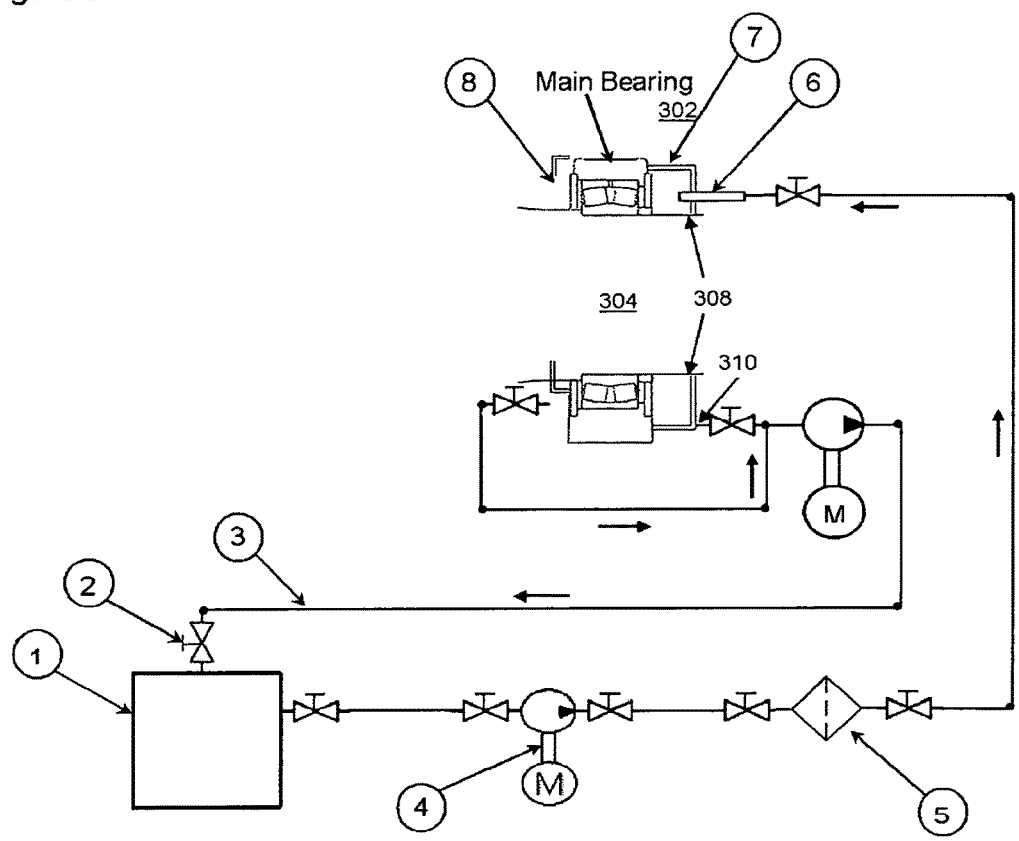
FIG. 3 shows an embodiment of an apparatus of the present invention.
Figure 4A:
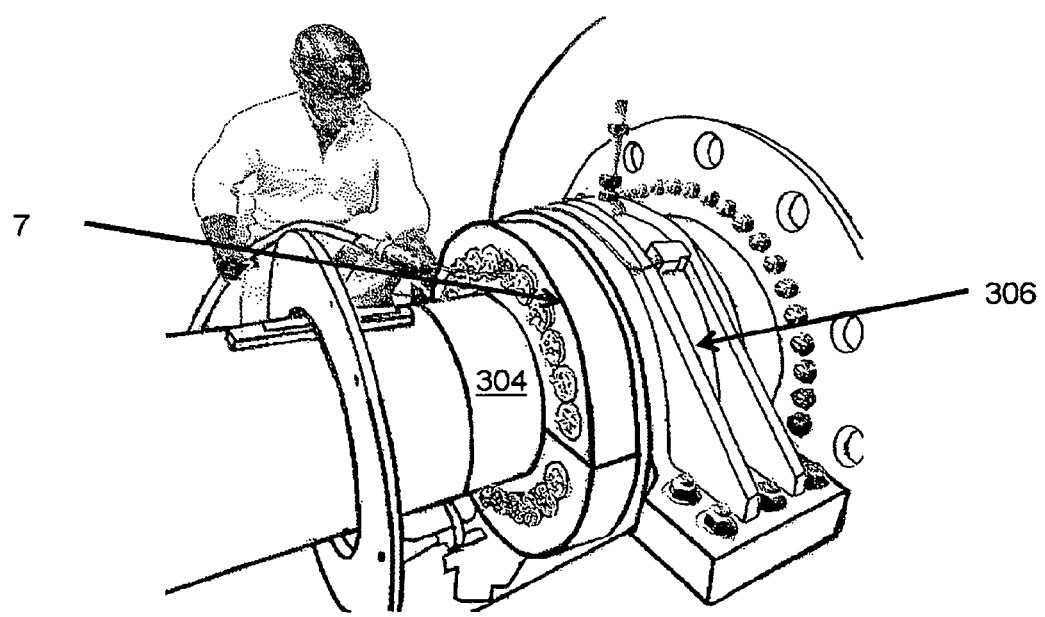
FIGS. 4a and 4B shows embodiments of the apparatus of the present invention in use.
Figure 4B:
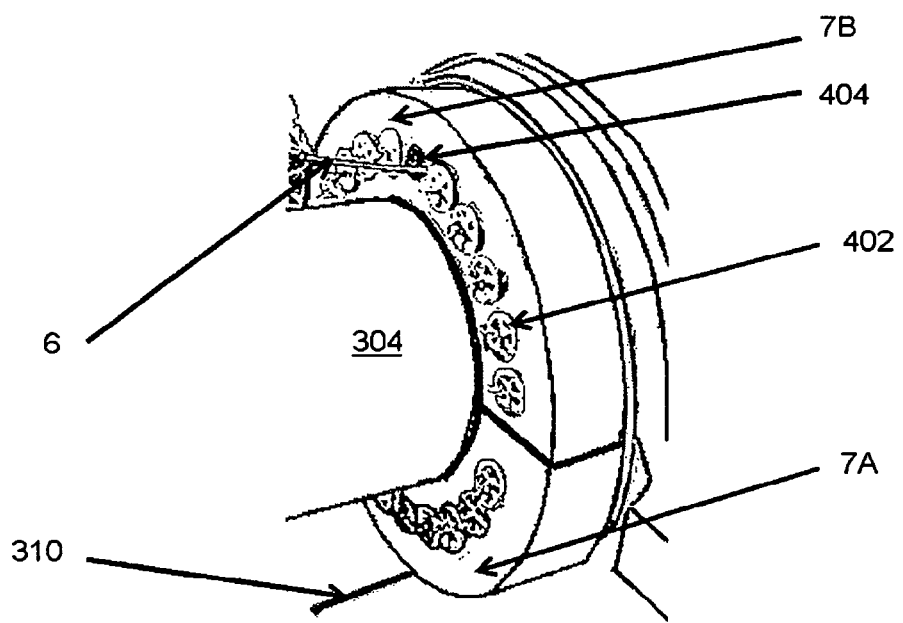

A feature of this approach can be understood by reference to FIGS. 3, 4A and 4B, which shows that the flushing cover (7) comprises at least two parts (7A, 7B) which fit around the main shaft (304), each part comprising sealing means (308) on a radially inner surface so that when attached to the bearing housing (306), the flushing cover forms a seal with the main shaft. Another advantage of this approach is the use of a reservoir containing cleaning fluid, and pumping cleaning fluid from this reservoir, via filters if required, to the spraying device used in steps 4 and 6. Used cleaning fluid is pumped out of the bottom of the housing/flushing cover and back to the reservoir. This means that the cleaning fluid is recycled during the replacing of the grease, and as little as 30 L of cleaning fluid may be used to provide efficient removal in situ of old grease.

FIG. 3 shows a schematic of an apparatus for flushing grease from a main bearing (302) of a wind turbine. The apparatus comprises flushing cover 7 which has fastenings for mounting it on the housing of the Main Bearing. As shown, flushing cover 7 goes around the main shaft. Flushing cover 7 is on the downwind (generator) side of the main bearing, an equivalent flushing cover 8 can be attached on the upwind (rotor side) of the bearing. Depending on the Main Bearing arrangement one or both flushing covers are used. The flushing cover has a plurality of holes (402) as described above, and it includes an exit port (310), although in some situation a drain from the bearing housing might be used. There is a corresponding plurality of removable plugs for sealing the holes (404). A reservoir 1 contains the cleaning fluid and is connected to a spraying means 6, typically a spray nozzle held by an operator. Cleaning fluid is pumped from the reservoir to the spraying means 6 via a supply hose in the direction shown by the arrows by pressure pump 4. Pressure pump 4 can be electric. A second pump, this time a suction pump, moves cleaning fluid from the exit port to the reservoir via a return hose 3.

Where the cleaning fluid used is oil, it may be heated or where it is a solvent, it is typically at ambient temperature. Where the cleaning fluid used is heated oil, heating may be provided directly by, for example, immersion heaters in the reservoir, or more beneficially heating may be provided indirectly, either via a heat exchanger or by heaters on the outside of the reservoir. This avoids problems of overheating the oil.

The flushing cover comprises at least two parts as described above, and in use these fit around the main shaft, each part comprising sealing means on a radially inner surface. When attached to the bearing housing, the flushing cover thus forms a seal with the main shaft. Pumping cleaning fluid to the spraying means and spraying the cleaning fluid onto the main bearing via one of the holes for admission of a cleaning fluid, the remaining holes being sealed by a corresponding removable plug, flushes grease from the main bearing.

In the above, the flushing cover is described as being, in effect, a replacement for the bearing cover. The flushing cover may also be fitted between the bearing cover and the bearing housing, and the axially arranged bolt holes engage with the housing through the flushing cover. The flushing cover thus acts as an intermediate spacer with flushing holes.

Alternatively, the flushing cover is attached to the housing and the bearing cover is attached to the flushing cover. The flushing cover has radially arranged sealable holes around its perimeter for providing access to the spraying means. In these arrangements, the flushing cover can be a permanent part of the bearing arrangement, simplifying subsequent maintenance activities.

The spraying means 6 typically comprises a spray nozzle, which means that cleaning fluid is introduced under pressure to push grease off bearing surfaces.

The supply hose comprises one or more supply filters 5, typically 10 micron, which means when recirculated, the cleaning fluid is cleaned and particulate material which could damage the bearing surfaces is removed.

Connection means, shown generally as 2, connect the one or more supply filters to the supply hose, which means the filter can be easily removed and replaced.

Similarly the return hose may comprise one or more return filters to return filtered cleaning fluid returned to reservoir, removing particulate material. Again, connection means 2, connect the one or more return filters to the return hose, which means the filter can be easily removed and replaced.

Other connection means 2 connect the first pumping means to the supply hose, the second pumping means to the return hose, the spraying means to the supply hose, and the exit port to the return hose. The connection means is a dry break coupling, which means that connections can be easily made and unmade, even in use.

As mentioned above, the first pumping means is a pressure pump and the second pumping means is a suction pump.

The apparatus is advantageously provided as a module comprising the reservoir, the first pumping means and the second pump means, held in a chassis to facilitate hoisting from the ground into the nacelle.

In addition, the module can comprise the supply filter and/or the return filter.

This provides a kit-like approach to the flushing problem

The reservoir has a capacity in the range of 10 to 50 L, and more typically is 25 to 35 L.

The invention claimed is:

1. A method for flushing grease from a main bearing and main bearing housing of a wind turbine comprising the steps of:
    a) providing access to the main bearing;
    b) installing a flushing means on the housing, in which the flushing means comprises a plurality of sealable holes allowing access to the main bearing;
    c) spraying a cleaning fluid via one of the sealable holes onto the main bearing to remove grease, the remaining holes being sealed stopping the cleaning fluid and removed grease escaping;
    d) pumping cleaning fluid and removed grease out of the housing; and
    e) repeating steps c) and d) spraying the fluid via one or more of the remaining sealable holes.

2. The method according to claim 1, in which the flushing means comprises a plurality of holes arranged around an outer region allowing access to the main bearing.

3. The method according to claim 1, in which the step of spraying a cleaning fluid comprises:
    providing a reservoir containing cleaning fluid;
    providing a spraying means comprising one or more spray nozzles; and
    providing a first pumping means for pumping cleaning fluid from the reservoir to the spraying means via a supply hose, the supply hose comprising one or more supply filters.

4. The method according to claim 3, in which the first pumping means is a pressure pump.

5. The method according to claim 3, in which the reservoir has a capacity in the range of 10 to 50 L.

6. The method according to claim 3, in which the reservoir has a capacity of 25 to 35 L.

7. The method according to claim 3, in which the step of pumping cleaning fluid out of the bearing housing additionally comprises providing a second pumping means for pumping cleaning fluid to the reservoir via a return hose, the return hose comprising one or more return filters;
wherein the cleaning fluid is recycled during the flushing of the grease.

8. The method according to claim 7, in which the second pumping means is a suction pump.

9. The method according to claim 1, in which the cleaning fluid comprises a solvent.

10. The method according to claim 9, in which the solvent is a high flash point solvent.

11. The method according to claim 1, in which the cleaning fluid comprises oil.

12. The method according to claim 11, in which the oil is hot oil.

13. The method according claim 12, in which the method further comprises providing heating means for heating the oil.

14. The method according to claim 13, in which the heating means comprises indirect heating means.

* * * * *

UNITED STATES PATENT AND TRADEMARK OFFICE
CERTIFICATE OF CORRECTION

| | |
|---|---|
| PATENT NO. | : 10,036,424 B2 |
| APPLICATION NO. | : 14/675898 |
| DATED | : July 31, 2018 |
| INVENTOR(S) | : Richard Smith et al. |

It is certified that error appears in the above-identified patent and that said Letters Patent is hereby corrected as shown below:

On the Title Page

In (72) the inventors:
Please delete "Michael Ulfert Homemann" and insert therefor --Michael Ulfert Hornemann--

Signed and Sealed this
Third Day of September, 2019

Andrei Iancu
*Director of the United States Patent and Trademark Office*